United States Patent
Durfee, Jr.

(10) Patent No.: US 12,295,305 B1
(45) Date of Patent: May 13, 2025

(54) MODULAR RAISED GARDEN BED SYSTEM

(71) Applicant: David L Durfee, Jr., Meadville, PA (US)

(72) Inventor: David L Durfee, Jr., Meadville, PA (US)

( * ) Notice: Subject to any disclaimer, the term of this patent is extended or adjusted under 35 U.S.C. 154(b) by 0 days.

(21) Appl. No.: 17/316,548

(22) Filed: May 10, 2021

(51) Int. Cl.
*A01G 9/28* (2018.01)

(52) U.S. Cl.
CPC ..................................... *A01G 9/28* (2018.02)

(58) Field of Classification Search
CPC ...... A01G 9/02; A01G 9/023; A01G 13/0206; A01G 9/28
USPC .............................................................. 47/33
See application file for complete search history.

(56) References Cited

U.S. PATENT DOCUMENTS

| | | | | |
|---|---|---|---|---|
| 510,696 A * | 12/1893 | Meases | ................... | A01G 9/28 52/169.9 |
| 1,851,710 A * | 3/1932 | Lefevre | ................... | A01G 9/20 47/33 |
| 2,115,868 A * | 5/1938 | McIntosh | ............ | E04H 13/003 47/33 |
| 2,436,770 A * | 2/1948 | Hill | ......................... | A01G 9/28 47/33 |
| 2,662,343 A * | 12/1953 | Rice | ....................... | E01C 9/004 47/33 |
| 4,068,423 A * | 1/1978 | Marsh | ................... | E04H 1/1205 47/17 |
| 5,400,544 A * | 3/1995 | Wien | ...................... | A01G 9/28 47/33 |
| 7,424,787 B2 * | 9/2008 | Singer | ..................... | A01G 9/28 47/79 |
| 8,904,706 B1 * | 12/2014 | Smith | .................... | A01G 9/027 47/65.6 |
| 10,064,344 B1 * | 9/2018 | Meyer | ..................... | A01G 9/02 |
| 10,492,379 B1 * | 12/2019 | Meyer | .................... | A01G 9/249 |
| 2002/0007593 A1 * | 1/2002 | Mischo | .................. | A01G 9/033 47/86 |
| 2002/0078636 A1 * | 6/2002 | Whitson | ................. | A01G 9/28 52/604 |
| 2005/0047868 A1 * | 3/2005 | Byles | ..................... | A01G 25/00 47/20.1 |
| 2015/0201563 A1 * | 7/2015 | Chiang | .................. | A47G 7/041 47/86 |
| 2018/0139910 A1 * | 5/2018 | Mobed | .................... | A01G 17/00 |
| 2018/0177167 A1 * | 6/2018 | Topping | ................. | A01G 22/60 |

OTHER PUBLICATIONS

Ana White, Ana White—DIY Greenhouse, Nov. 2, 2019, URL: <https://www.ana-white.com/woodworking-projects/diy-greenhouse> (Year: 2019).*

* cited by examiner

*Primary Examiner* — Brady W Frazier
*Assistant Examiner* — Zoe Tam Tran
(74) *Attorney, Agent, or Firm* — Richard K Thomson

(57) ABSTRACT

A plurality of variously sized modules can be interconnected using various length of walkways to provide a unit. Each module includes two end walls and two side walls secured to a rectangular base. Legs elevate the modules and walkways above ground level. A bottom in each module is secured ½ way up the sides of the module walls and have drainage holes. A step and hand rail afford access to the raised garden bed through a latched door.

4 Claims, 3 Drawing Sheets

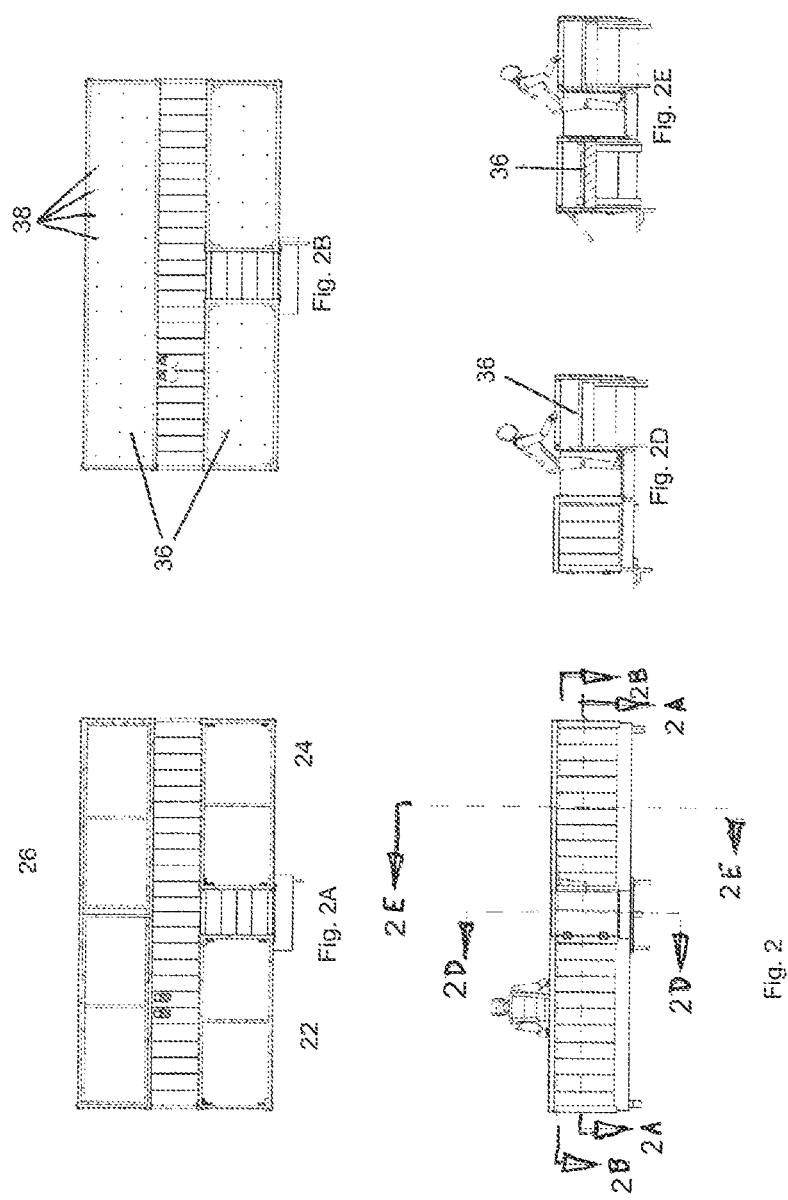

MODULAR RAISED GARDEN BED SYSTEM

This application claims priority benefit of provisional pat. appl. Ser. No. 63/022,021 filed May 8, 2020 which application is incorporated by reference in its entirety.

BACKGROUND AND SUMMARY OF THE INVENTION

The present invention is directed to the field of horticulture. More particularly, the present invention is directed to a modular raised bed system for gardening.

A variety of window box and grow boxes designed to sit on a patio or deck have been devised. Among them Earthbox™ and City Pickers™ patio garden kits. These devices are comparatively small and useful for growing a few herbs, tomato plants, or flowers. More recently, a somewhat larger Vegepod™ system has been developed "down under". This system is modular and comprises a grow box which sits on legs and may be provided with a cover having spray irrigation cascading therefrom. For those use to cultivating a full scale garden, these smaller scale systems are very limiting and generally disappointing.

It is among the objects of the present invention to provide a modular system more analogous to a greenhouse without comparable expense. Typically, each module will be on the order of 4'×8' or combined to 8'×16', depending on the application. This size allows for shipping on a flat truck bed without oversized load travel restrictions. Each module is elevated on legs with gated aisles to permit ready access to the grower for cultivation and harvest while excluding rodents, rabbits and deer which enjoy feeding on the tender plants, interfering with the desired horticultural production. Additional advantages of the present modular raised bed garden system is that the beds can be cultivated from a standing position so those who have physical limitations of bad back, knees, etc., can still enjoy gardening without the pain attendant a ground level garden. The modular design can accommodate variations in base ground level such as slopes or terraces. The fact that the modules are raised places the plots for growing above the normal weed seed zone reducing the labor necessary to maintain a weed-free garden bed. Lastly, the drainage system of the beds is designed to direct water away from walkway aisles. A translucent cover can restrict access of insects, birds, etc.

The present invention comprises a modular raised garden bed system having a) a plurality of variously sized, interconnectable rectangular grow modules having i) two side walls, ii) two end walls, iii) a rectangular base frame to which the side walls and end walls are secured, iv) each module having a floor securable ½ way up said side walls and the end walls above the base frame to afford easy access to a standing gardener, iv) legs secured to the base frame upon which the modules are supported; b) a plurality of walkways used to interconnect the rectangular grow modules into a unit.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 2 is a front view of the second embodiment;

FIG. 2A is a cross-sectional top view of the second embodiment as seen along lines 2A-2A in FIG. 2;

FIG. 2B is a cross-sectional top view as seen along lines 2B-2B in FIG. 2;

FIG. 2D is a cross-sectional end view as seen along lines 2D-2D in FIG. 2;

FIG. 2E is a cross-sectional end view as seen along lines 2E-2E in FIG. 2;

DETAILED DESCRIPTION OF THE PREFERRED EMBODIMENT(S)

Figure 1A:
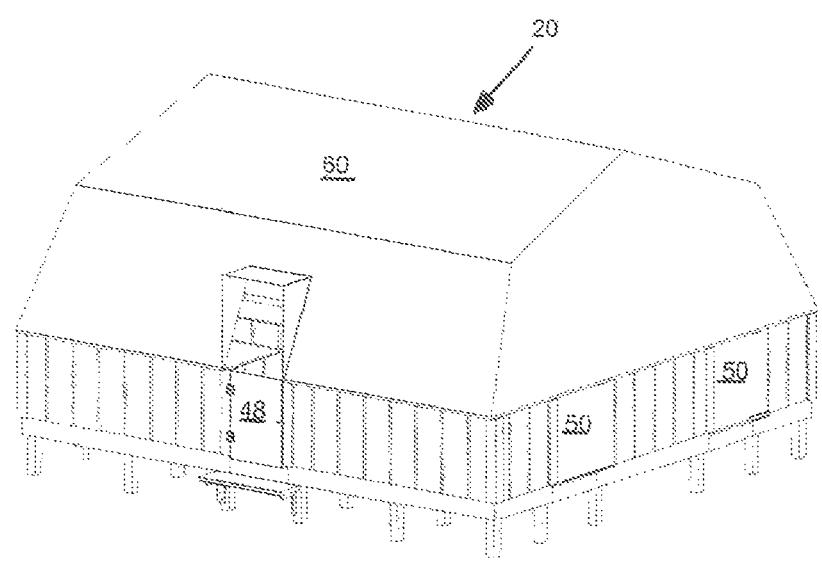
FIG. 1A is a front perspective view of a first embodiment of the modular raised bed garden system of the present invention.

A first embodiment of the modular raised garden bed system of the present invention is depicted in FIG. 1A generally at 20. The raised garden bed system 20 of the present invention comprises a plurality of variously sized grow modules 22, 24, 26 and 28 which may be, by way of example and not limitation 2'×4', 3'×6', 2'×8', 4'×4', 4'×6' 4'×8', 2'×12' and the like. Each module (FIG. 3) 22, 24, 26, 28, 29 has a rectangular base 25 which is equipped with attached legs 30 that raise the garden bed above the ground. By doing so, the garden beds are raised above the normal weed seed zone, and access by rodents, raccoons, deer and other would-be vermin consumers is restricted/eliminated. In addition, each grow module has a bottom 36 positioned ½ way up (or above) the walls 32, 34 of the module. This raising of the bottom 36 provides the gardener better access to the items being grown and avoids unnecessary kneeling and bending which are problematic for persons having problems with their knees and backs and generally take them out of the gardening game. The bottom 36 is provided with drainage holes 38 across the entire surface to prevent root rot and other problems related to excess retained moisture.

Figure 1B:
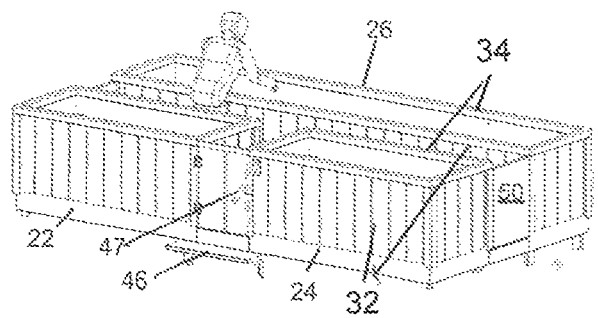
FIG. 1B is a front perspective of a second embodiment with the cover removed.
Figure 3:
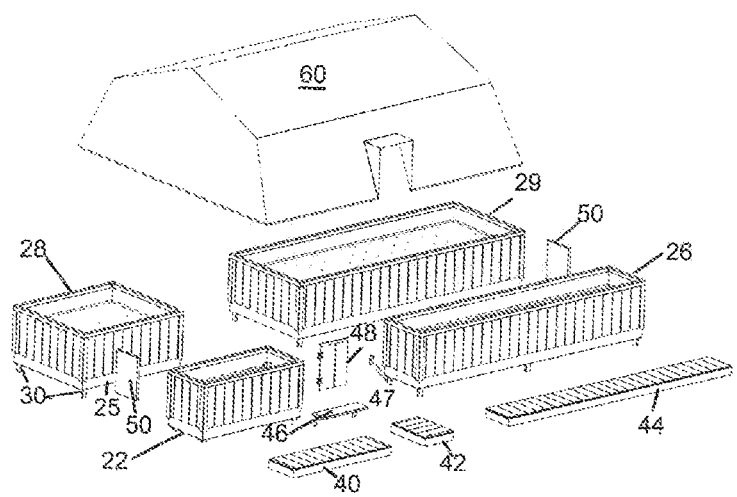
FIG. 3 is an exploded front perspective view of a third embodiment of the modular raised bed garden system of the present invention with the walkways pulled to the front for visibility.

As best seen in FIG. 3, variously sized walkways 40, 42, 44 are provided to allow construction of an enclosed raised bed garden system. In addition, a step 46, a handrail 47, a latchable door 48 and end caps 50 are provided to complete the garden system 20. By comparing FIG. 1A and FIG. 1B, it will be evident that additional rows of modules can be added to customize the bed to best fit the needs and plot size of the owner-gardener. Lastly, opaque cover 60 can be customized to fit the specific sized modular garden bed to protect the garden from wind storms, nighttime invasions of a variety of insects, birds, and other types of garden pests. Opaque cover 60 can be optional and or removed when occasion permits to allow rain watering of the plant and increased sun access.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A modular raised garden bed system comprising
   a) a plurality of variously sized, interconnectable rectangular grow modules each having i) two side walls,
  ii) two end walls,
  iii) a rectangular base frame to which said side walls and end walls are secure,
  iv) each of said plurality of variously sized, interconnectable rectangular grow modules having a floor securable ½ way up said side walls and said end walls above said base frame to afford easy access to a standing gardener,
  v) legs securely attached to said base frame upon which said rectangular grow modules are supported above ground level;
 b) a plurality of walkways used to interconnect said rectangular grow modules into a unit by attaching said plurality of walkways to at least one of said two side walls of said rectangular grow modules, said plurality of walkways affording the standing gardener a place from which to access the garden supported by said floors of said interconnectable rectangular grow modules.

2. The modular raised garden bed system of claim 1 further comprising a step interconnectable to at least one of said rectangular grow modules.

3. The modular raised garden bed system of claim 2 further comprising a latchable door attachable to at least one of said rectangular grow modules adjacent said step.

4. The modular raised garden bed system of claim 1 further comprising a removable opaque cover attachable to said raised garden bed system.

\* \* \* \* \*